Sept. 6, 1966  W. A. KEETCH  3,270,998
ELASTOMERIC ISOLATOR
Filed Sept. 30, 1964  2 Sheets-Sheet 1
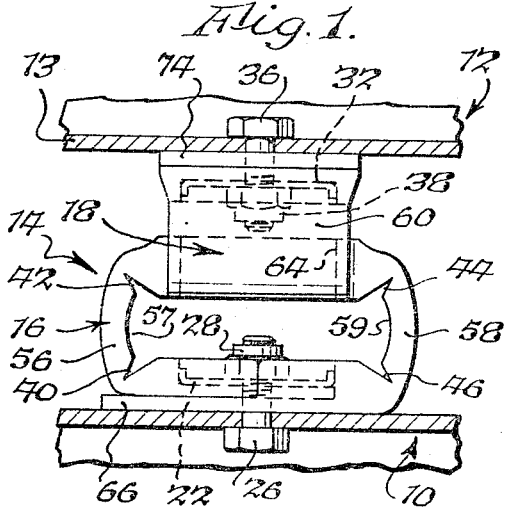
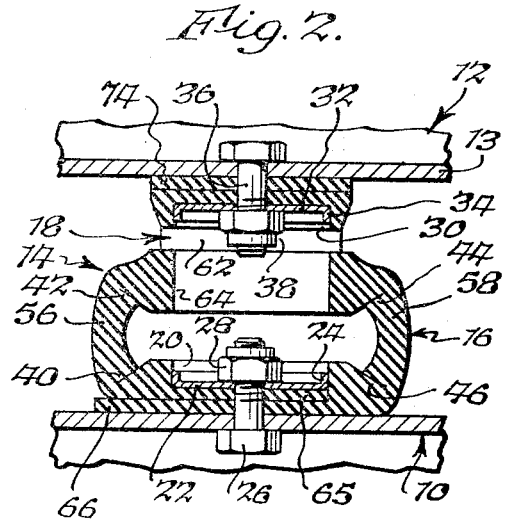
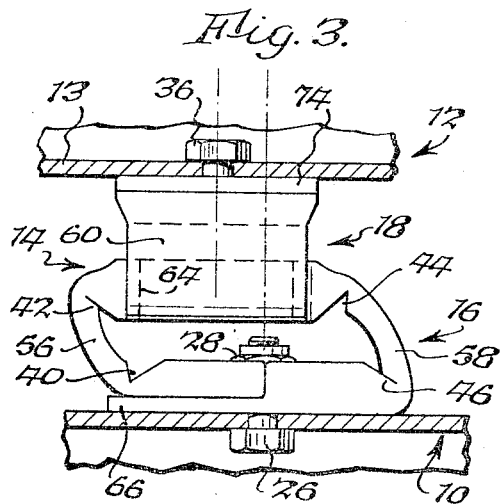
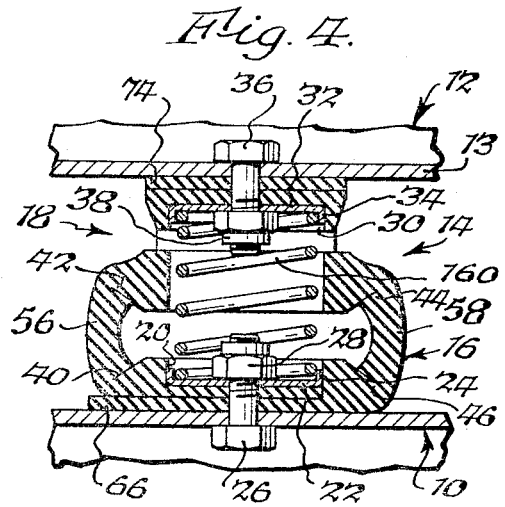
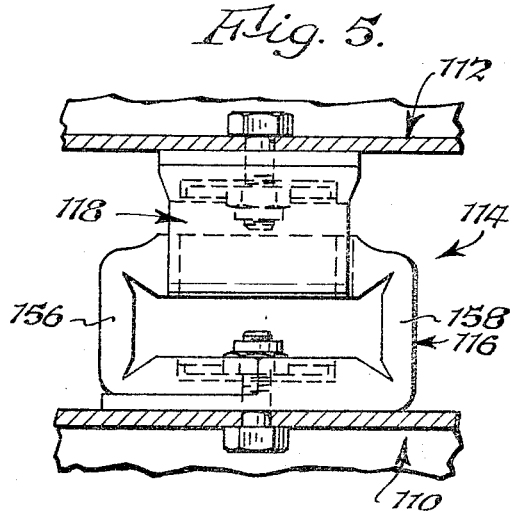
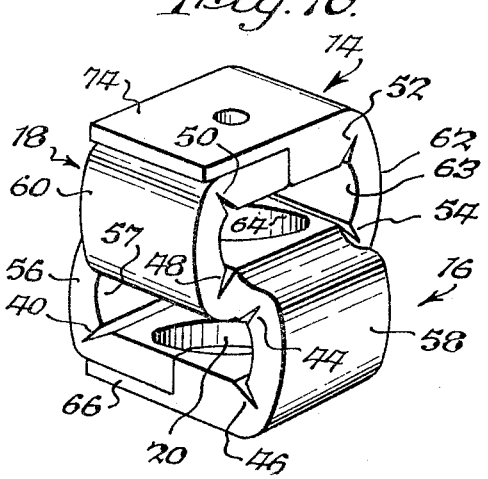

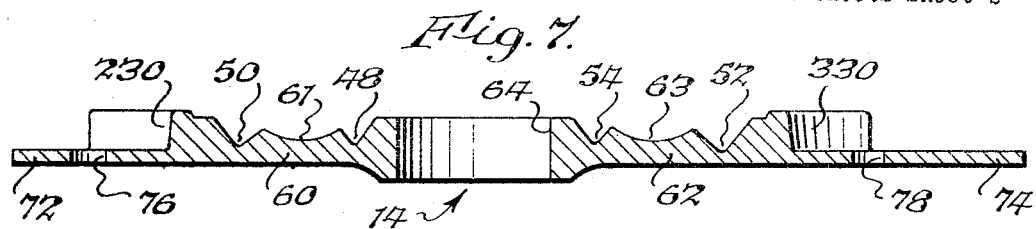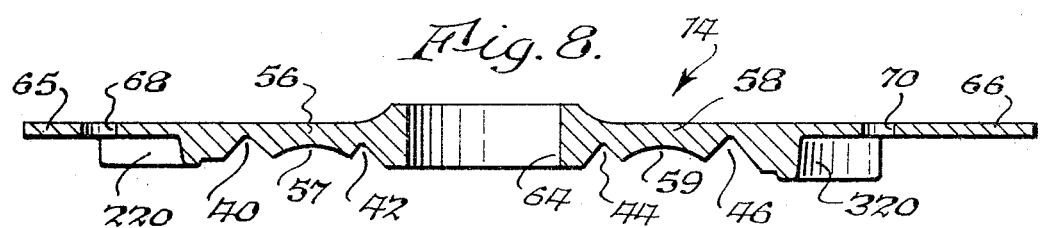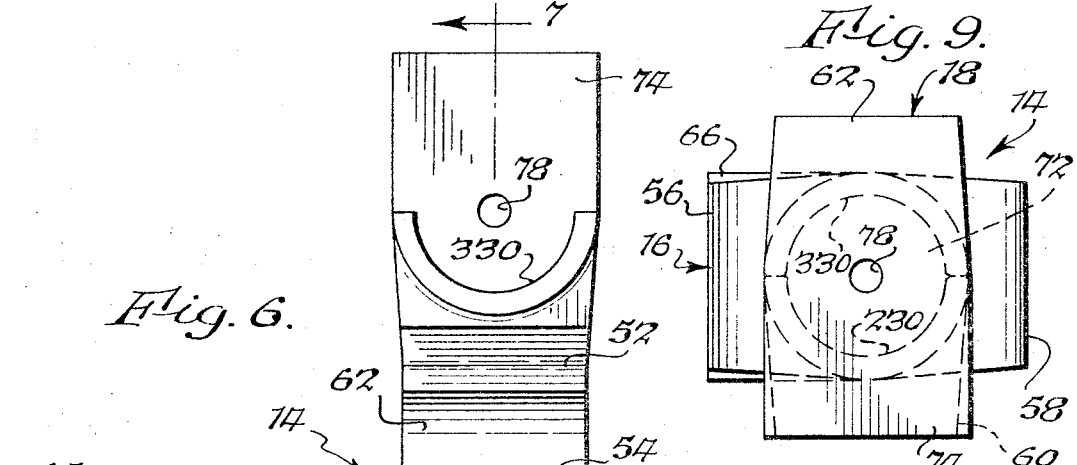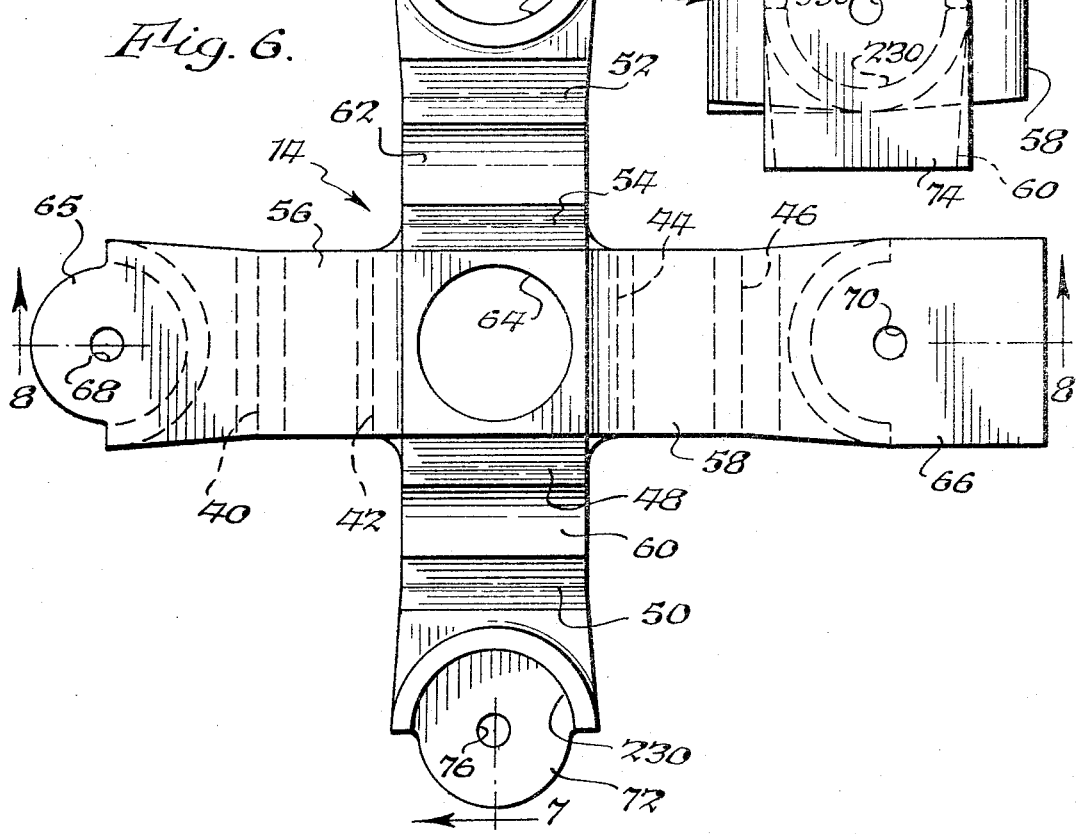

United States Patent Office 3,270,998
Patented Sept. 6, 1966

3,270,998
ELASTOMERIC ISOLATOR
William A. Keetch, Ho-Ho-Kus, N.J., assignor to Robinson Technical Products, Inc., Teterboro, N.J., a corporation of New York
Filed Sept. 30, 1964, Ser. No. 400,330
4 Claims. (Cl. 248—358)

The present invention relates to a vibration and shock isolating device which utilizes as an improved element thereof an elastomeric body which is so constructed as to afford relatively light resistance to displacements of low order and to afford rapidly and progressively increasing resistance to displacements of progressively greater order, and capable of substantially greater displacements relative to its size than previously existing designs.

Elastomeric substances, such as rubber and the like, which are not compressible have the property of resiliency when they are given such form as to permit displacement incident to the absorption of energy. A simple elastomeric cushion, such for example as a block of rubber proportioned to provide a low initial stiffness, offers a substantially linear resistance to progressively increasing displacement over a relatively wide working range. Thus when such a cushion is so designed as to be deflected to an extent sufficient to effectively isolate vibrations of relatively small amplitude under relatively light loading it will be deflected to such a great extent under heavy shock loads as to be ineffective to isolate the latter. Therefore in the design of elastomeric vibration and shock isolators it has become quite common to confine the elastomeric element in such a manner as to restrict the maximum extent of displacement of the elastomeric material whereby the isolator will "bottom out" under loads which are in excess of such loads as it can effectively isolate. In some cases the range of effectiveness has been somewhat extended by so shaping the elastomeric element that greater volumes thereof are displaced under heavier loading. The present invention provides elastomeric elements of shapes such as to have effective ranges much broader than heretofore available, and, in addition, to provide, in a single element such capability in three mutually perpendicular planes as may be required.

Vibration and shock isolating units of the type here involved are generally used in groups, for example a unit might be secured to each of the four corners of a box which contains an instrument which is to be isolated from shocks and vibrations originating in or transmitted to the support to which the units are attached, or which contains a machine or motor which produces vibration or shock loads which it is desired to isolate from the support to which the units are attached. In either event the forces causing displacement incident to vibratory or shock loading may be applied from any direction to the box or to the support.

It is an object of the present invention to provide a shock and vibration isolator in which an improved resilient element is made of elastomeric material and is so designed that portions thereof of relatively small cross section will be distorted and correspondingly small resistance is offered when shock or vibratory loads of small amplitude are applied from any direction and in which rapidly and progressively increasing volumes of elastomeric material must be distorted and displaced, with rapidly increasing resistance, when forces of progressively greater magnitude are applied from any direction.

The objectives of this invention are achieved by the provision of a loop or, preferably, two loops arranged in series and disposed generally at right angles to one another and made respectively from generally flat ribbons of elastomeric material. The loop or loops have special conformations at properly spaced points in the inner periphery thereof whereby the effective thickness of the loop is varied over a relatively wide range depending upon the extent to which the loop may be distorted by an applied force or forces. While the loop or loops of elastomeric material may be used alone by the addition of suitable fastening devices it may be preferred to provide metal springs or other yieldable load-carrying or damping materials or means to carry a part of the load to adapt the device for specific uses or for minimizing drifting or creeping which ordinarily might occur when elastomeric materials of many types are subjected to a continuing load over a long period of time.

Other objectives of the present invention and various specific embodiments thereof will be clearly understood from a consideration of the following detailed description taken in connection with the drawings accompanying and forming a part of this specification. In the drawings:

FIG. 1 is a side elevational view of a vibration and shock isolating unit embodying the present invention, the same being shown connected between a support and a load and in a position assumed by the unit under design static loading;

FIG. 2 is a vertical sectional view of the device shown in FIG. 1 showing the same in a position which it will assume under a vertical load substantially in excess of the design static loading;

FIG. 3 is a view similar to FIG. 1 but showing the unit in a position which it will assume under a load coming from a direction such as to cause lateral displacement between the bodies to which the unit is connected;

FIG. 4 is a vertical sectional view similar to FIG. 2 but showing a modified form of the present invention;

FIG. 5 is a view similar to FIG. 1 but showing a still further modified form of the present invention;

FIG. 6 is a plan view of a blank from which the vibration and shock isolating unit shown in FIG. 1 may be formed;

FIGS. 7 and 8 are vertical sectional views taken along the lines 7—7 and 8—8 respectively in FIG. 6; and FIGS. 9 and 10 are plan and perspective views respectively of the blank shown in FIG. 6 after the same has been assembled to form a resilient element for use in the present invention.

Referring now to the drawings, there is shown a support 10 such as a shelf or bracket which, for the purposes of the present description, may be assumed to be attached to a mobile or stationary structure. A load 12 is diagrammatically indicated as having an attachment flange or plate 13. It will be understood that the load 12 may be something which produces vibratory or shock motions which it is desired to isolate from the support 10 or that the load 12 may be something in the order of a delicate instrument whose function or service life may be adversely affected by shock or vibratory motions originating in or transmitted through the support 10. The shock and vibration isolating device embodying the present invention is generally indicated at 14 and comprises a loop 16 formed from a generally flat strip or ribbon of elastomeric material the ends of which have been brought into overlapping and abutting relationship and a loop 18 of similar or identical material and construction. The axes around which the loops 16 and 18 have been formed lie approximately at right angles to one another in generally parallel horizontal planes. For the purposes of ready understanding of the construction of this embodiment of the invention it may be pointed out that in FIG. 1 the axis of the loop 16 extends vertically from the plane of the drawing and the axis of the loop 18 lies horizontally in a plane parallel with that of the drawing.

The loops 16 and 18 are connected together in back-to-back relationship or they may be formed integrally, as will be described below. The loops 16 and 18 may be symmetrically arranged, that is, at right angles to one another, and they may be identical in dimensions to afford generally uniform response in lateral directions. Also, they may be asymmetrically arranged or different in dimensions to afford non-uniform lateral response when such is desired. If so desired a resilient element similar to 14 may be made up of three or more loops similar to the loops 16 and 18 arranged in series and with the axes thereof appropriately distributed in symmetrical or asymmetrical arrangement as desired.

Any suitable means may be utilized to secure the resilient element 14 to the bodies between which isolation is desired. For example, as shown most clearly in FIG. 2 the loop 16 may be provided with a recess 20 into which is fitted a metal washer or cup 22 having an annular flange 24 and a central opening (not numbered) to receive a fastening device such as a bolt 26 inserted through suitable openings (not numbered) in the loop 16 and support 10. A nut 28 may be threaded upon the bolt 26 to secure the lower peripheral portion of the loop 16 against the support 10. The loop 18 may be similarly provided with a recess 30, a washer or cup 32 with annular flange 34 and a bolt 36 and nut 38 to secure the same against the flange 13 of the load 12.

The loops 16 and 18 are each provided with a plurality of grooves, generally V-shaped in cross-section, cut or molded in the elastomeric material and extending lengthwise generally parallel with the axis around which the loop is formed. The diverging walls of such grooves open into the inner periphery of each loop and the apex of each groove extends toward and terminates at a predetermined distance from the outer periphery of the loop, the effect being to form a plurality of relatively thin zones which will flex more readily than the remaining, thicker portions of each loop. Preferably, as shown in FIGS. 1 and 10 the loop 16 is provided with four grooves 40, 42, 44 and 46 while the loop 18 is provided with four grooves 48, 50, 52 and 54 and such grooves are so spaced as to lie in the inner corners of the generally rectangular shape of each loop 16 or 18. When the loops are formed from flat strips or from a cruciform blank, as will be described below, the rectangular shape aforesaid will be assumed when the material is bent into assembled position due to the relatively greater flexibility of the thin wall sections adjacent each groove. If the loops are initially molded in closed form the preferred rectangular shape can be imparted by proper shaping of the mold recesses.

The rectangular shape just discussed provides four wall portions hinged together at the grooves. This is not critical but offers the advantages of increased stability and lower profile over square or circular shapes incorporating the same active volume of elastomeric material. Similar advantages may be achieved by utilizing a trapezoidal cross-section in which the end walls 56 and 58 of loop 16, for example may diverge either toward or away from the zone of joinder between the loops 16 and 18. However each loop may be provided with more than four grooves and thus with more than four articulated walls.

In FIGS. 1 through 4 the end walls 56 and 58 of 16 are shown bulging outwardly under varying load conditions. It is preferred to so form the loops 16 and 18 that such end walls will bulge outwardly under no load in order to insure that they will bulge further outwardly when static or dynamic loads are applied from any direction. However, as shown in FIG. 5 the end walls of a modified elastomeric element 114 may be so formed that under design static loading they will assume a substantially vertical position from which they will bulge outwardly when additional vertical loading is applied. For example the end walls 156 and 158 of loop 116 are shown in such vertical position in said FIG. 5. Preferred manners of forming and imparting desired shape to the elastomeric elements 14 or 114 will be described below.

In FIG. 4 an elastomeric element 14, which may be of the same construction as that shown and described in connection with FIGS 1 through 3, is shown in an assembled position with a support 10 and a load 12. The showing in FIG. 4 differs from that in FIG. 2 only in that a coiled compression spring 160 is shown positioned within the element 14. The opposite ends of the spring 160 are received within the metal cups 22 and 32, respectively. Preferably, the diameter of the spring 160 is such as to fit snugly within said cups with the outer periphery of the end portions of the spring resting against the flanges 24 and 34, respectively. The spring 160 preferably is of such design and is placed under such a degree of pre-compression when placed within the unit 14 as to support a substantial portion of the static load for which the complete unit is designed. Preferably, the relationship between the spring 160 and elastomeric element 14 in such a combination is such that under design static loading the elastomeric element 14 will be compressed vertically into substantially the same position as is illustarted in FIG. 1. Stated otherwise, for a specific design static load the elastomeric element used in a combination as shown in FIG. 4 ordinarily will be more flexible, that is, less resistant to vertical compression, than an element 14 intended to operate alone as illustrated in FIG. 1.

The combination of elastomeric element 14 and spring 160 in FIG. 4 will operate in response to dynamic loading in much the same manner as that described above in connection with FIGS. 1 through 3. The spring 160 will exhibit an inherently linear response to deflections incident to shock or vibratory loads and will contribute to the effective isolation of such loads in the manner generally associated with the use of a coil spring. The elastomeric element 14, however, will exhibit a non-linear response, offering relatively light resistance to deflections of low order from the design static position and offering progressively increasing resistance to deflections of greater amplitude in any direction. The total dynamic response of the combination of coil spring 160 and elastomeric element 14 will be non-linear and thus offers the advantages afforded by the present invention.

By properly relating the spring rates of the coil spring 160 and elastomeric element 14 forming the combination shown in FIG. 4, in accordance with known principles, the overall response of the combination may be accurately fitted to the specific needs of a particular installation. Thus, the response of the combination to vibrations within the frequency range encountered in normal design operation will be dependent upon the relationship between the rate of the spring 160 and the rate of the element 14 when the latter is in positions in which at least some of the V-shaped notches or grooves 40–54 remain unclosed. The overall response of the combination to shock loading will depend primarily upon the non-linearity of the elastomeric element 14 when it has been displaced into a position in which some or all of the notches or grooves 40–54 are closed.

A particularly important function of the spring 160 in the combination illustrated in FIG. 4 flows from the fact that a metal coil spring ordinarily will exhibit substantially less inclination toward taking a permanent set or creeping or drifting under continued static loading than will many of the elastomeric materials currently available for the manufacture of elements such as the elements 14 herein disclosed. Thus, by designing the combination shown in FIGURE 4 in such manner that the spring 160 assumes a substanital role in the establishment of the amount of deflection of the combination under design static loading, the tendency of the combination to drift progressively towards a position of greater deflection will be substantially minimized.

The combination in FIG. 4 may be further modified by the addition thereto of cushioning or damping material (not shown) within the body of the coil spring 160. In some instances it may be desirable to omit the coil spring 160 and merely to position such material within the central cavity of the elastomeric element 14. Such additional cushion might be cylindrical in form and the opposite ends thereof engaged into the cups 22 and 32, and may be comprised of any suitable material such as metal mesh (U.S. Patent 2,687,270), plastic, elastomeric foam or other resilient material.

The principles of operation of the elastomeric elements 14 and 114 are substantially the same irrespective of whether they are to operate alone, as shown in FIGS. 1, 2, 3 and 5, or in combination with a coil spring or other supplementary device, as disclosed in connection with FIG. 4. Referring to FIG. 1, in which the elastomeric element 14 is shown under design static loading, it will be observed that the grooves 40, 42, 44 and 46 which are visible in said figure, as well as the grooves 48, 50, 52 and 54 which are formed in the loop 18, but are not visible in said figure, are unclosed. Thus, displacement due to dynamic loading, such as vibration or shock tending to product deflection between the bodies 10 and 12 in any direction and of relatively light magnitude will be resiliently resisted by the flexing of the relatively thin wall portions of the loops 16 and 18 which lie adjacent the bottoms of the grooves referred to above. The desired range of magnitude of deflections through which the response of the elastomeric elements 14 or 114 remains relatively light and delicate may be determined by the selection of an appropriate angle between the sloping faces of the grooves 40–54. The application of additional forces, such as shock loads, will result in closing of the grooves, or some of them, as illustrated in FIGS. 2 and 3 whereby a substantially greater volume of elastomeric material must be deflected in response to further increasing loads. As will be apparent, the closing of some or all of the grooves 40–54 will occur earlier with small angles and later with larger angles between the sloping walls of such grooves.

The grooves 40–54 need not have the preferred V-shape disclosed above to accomplish the general results desired. Thus, the apices of the grooves may be rounded somewhat or may be rounded to such an extent as to impart a key-hole shape to the grooves. Also, the walls may be generally parallel with the grooves rectangular in shape in which event the spacing between walls may be selected to accomplish desired timing of groove closing.

The spring rate of the elastomeric elements 14 or 114 within the range of deflections of relatively small amplitude just discussed may be determined by the selection of appropriate depth of the grooves relative to the thickness of the walls in which they are formed. As will be apparent, deeper grooves in a wall of specific thickness will leave thinner wall portions adjacent the bottoms or apices of the grooves than will be left adjacent grooves of less depth in the same walls. The spring rate and the effective range thereof of the elastomeric elements 14 or 114 when some or all of the grooves 40–54 are closed may be determined by selection of appropriate thickness for the end walls of the loops. For example, the thickness of the end walls 56 and 58 of the loop 16 as shown in FIGS. 1, 2 and 3 is such as clearly to offer greater resistance to further deflection in the directions in which the element 14 has been deflected in FIGS. 2 and 3.

It will be understood that the spring rates and ranges just discussed are also dependent upon the particular elastomeric material or compound used as well as upon the degree to which curing or vulcanization may be carried and the relative amount and nature of any filling, extending or other modifying materials which may be used in the elastomeric compound.

From all of the above it will be appreciated that very widely varying performance characteristics may be imparted as desired to the elastomeric elements of the present invention, whereby they may be adapted for use in a great number of specific applications.

From a consideration of FIGS. 1 and 2, it will be appreciated that upon the application of a truly vertical load in a downward direction upon the supported element 12, all of the grooves 40–54 in both of the rings 16 and 18 will progressively move toward a closed position. The grooves 40–54 may be so designed as to close simultaneously or sequentially, as may be desired. When they are closed, as illustrated in FIG. 2, any further downward deflection will be resisted throughout the length of both loops 16 and 18 by the full thickness of the elastomeric walls. Under these circumstances, therefore, there will be a relatively sharp increase in resistance against further deflection. While it is possible for the supported element to receive shock loads which are in a truly vertical direction, it will be appreciated that most shock loading, as well as vibratory loading, is random in direction. Therefore, the more usual type of displacement of the elastomeric element 14 will be similar to that shown in FIG. 3 and will result from the application of a force or forces having components on vertical and horizontal axes. Under these circumstances, only certain of the grooves 40–54 will close under shock loads and others of the grooves will be moved toward a more open position. However, as will be apparent from FIG. 3, the closed grooves 42 and 46 bring into effect the full thickness of the adjacent walls and rapidly increasing resistance is thereby offered against further deflection in the same direction.

As has been indicated above, the elastomeric element 14, as well as the element 114 shown in FIG. 5, may be formed from a suitable elastomeric material in almost any desired manner. The rings 16 and 18 may be formed separately and secured together by adhesive or by mechanical bonding or fastening or the rings may be formed integrally, as by molding them more or less in their final conformation or by stamping or molding them in the form of a flat blank of cruciform configuration. The grooves 40–54, as well as the various openings and the like which are required may be formed in the molding operation or they may be formed by machining or stamping operations, as desired. However, it has been found preferable from the standpoint of economy and convenience to form a cruciform blank by molding the same from elastomeric material in suitable molds which are so contoured as to form all of the notches, grooves, openings and other configurations chosen for any particular embodiment of the present invention. In all cases involving the use of a blank or blanks the element 14 or 114 may be erected and fastened together and the erected structure may or may not be subjected to further curing or heat-setting as desired.

In FIGS. 6, 7 and 8 the elastomeric element 14 is shown in the form of a blank which has been molded from a suitable elastomeric material. The blank consists of two crossed arms extending from a central portion which may be solid or in which may be formed a circular opening 64 of sufficient diameter to receive a metal spring 160 or equivalent in the event one is used as shown in FIG. 4. The arm which extends horizontally as viewed in FIG. 6 and which is shown in section in FIG. 8 is the portion of the blank which forms the lower loop 16 as shown in FIG. 1. Accordingly, said arm has formed therein the V-shaped grooves 40, 42, 44 and 46. Also, as shown in FIG. 8 it is provided with concavely curved surfaces 57 and 59 respectively within the portions of the blank which form the bulging end walls 56 and 58 in the erected blank 14. The concavity of these surfaces is so selected that when the blank is erected the walls 56 and 58 will have adequate effective thickness and will assume the bulged shapes shown in FIGS. 1 and 2. Also, said arm has formed thereon half-circular walls 220 and 320 which meet, when the blank is erected to form the recess 20 shown in FIG. 2. The opposite ends of said arm terminate respectively in flaps 65 and 66 which overlap as shown in FIG. 1 to form the bottom wall of the element 14.

The flaps 65 and 66 are provided respectively with openings 68 and 70 which are unnumbered in FIGS. 1 and 2 but which serve to receive the mounting bolt 26.

The vertically-extending arm of the blank shown in FIGS. 6 and 7 is the one which forms the upper loop 18 of the elastomeric element 14. This arm is provided with the V-shaped grooves 48, 50, 52 and 54, and with half-circular walls 230 and 330, concave surfaces 61 and 63, flaps 72 and 74, and openings 76 and 78, all of which may be identical with corresponding features described above in connection with the horizontally extending arm in FIG. 6.

The blank shown in FIGS. 6, 7 and 8 is erected into the position illustrated in FIGS. 9 and 10 by bending the opposite ends of the arm which extends horizontally in FIG. 6, downward and towards each other. The flap 66 is overlapped upon the outer surface of the flap 65. The flaps may be secured in overlapped position by a suitable adhesive material or by staples or other fasteners as may be desired. The opposite ends of the arm which extends vertically in FIG. 6 are bent upwards and toward each other, the flap 74 overlapping the outer surface of the flap 72. These flaps are united as above in any suitable fashion.

Preferably the erected blank or elastomeric element 14 is then subjected to an after-cure or heat-setting operation appropriate for the particular elastomeric material from which it is formed. Preferably, also, the erected blank is held in a position corresponding substantially with the position which it will assume under its design static loading. This may be done by placing the erected blank between horizontally disposed upper and lower plates (not shown) which are vertically spaced from one another by a distance substantially equal to the total height of the elastomeric element 14 when the same is under design static load. The spaced plates referred to may be formed as a part of a C-shaped clip of appropriate size to hold one, or preferably several, erected blanks 14 during the curing operation. While such after-curing or heat-setting operation may not be necessary with all forms of elastomeric materials which might be employed in the practice of the present invention, it has been found to be highly desirable in connection with polyurethane which is a material which has been found particularly useful in the present invention in view of its well-known characteristics of relative insensibility to temperature variations within a wide range, as well as its toughness, durability and great tear strength.

The elastomeric element 114 shown in FIG. 5 may be erected from a blank similar to that illustrated for the elastomeric element 14. In this particular instance the portions of the blank which are to form the end walls of the loops 116 and 118 need not be provided with concave inner surfaces corresponding with the surfaces 57, 59, 61 and 63 in FIG. 8, inasmuch as in this form of the invention the end walls are intended to stand substantially vertically under design static loading. The blank otherwise may be identical with that shown in FIG. 6. The erection procedure is the same. In the event after-curing or heat treatment is to be effected it is preferred not only to place the assmbled blank under vertical compression toward its static load position but also to provide additional pressure plates or blocks having vertical surfaces which are pressed laterally against the opposed end walls of both the lower loop 116 and the upper loop 118 to hold the same in substantially vertical condition during the curing or heat-setting operation.

It should be noted that the elastomeric element 14 as shown in FIG. 10 has an overall configuration which it would assume under design static load and in which it may have been held in the event it was after-cured or heat-set after erection. It is not intended to convey the impression that the element 14 necessarily would assume or retain such configuration when it is unconfined as it appears in said FIG. 10. As a matter of fact, even though the element 14 may have been after-cured the elastomeric material need not have been cured to such a degree as permanently to assume the illustrated configuration. Ordinarily, the elastomeric material will tend to a greater or lesser extent to spring back towards its intially flat shape. Thus the loops 16 and 18 usually will be somewhat oval rather than rectangular when unconfined. Obviously the configuration illustrated in FIG. 1, for example, will be assumed when the fastening devices 26, 28 and 36, 38 are tightened to secure the completed unit to the support 10 and load 12 respectively.

As noted above, elastomeric elements embodying the present invention may comprise a single loop, such as the loop 16 alone. In such event the device will be effective to isolate vibrations and shock from almost any direction with good effectiveness. However, the effectiveness would be substantially different in connection with those components of the forces involved which lie parallel with the length of the grooves 40, 42, 44 and 46. Accordingly, in those cases wherein substantially equal effectiveness in all directions is desired, it is preferred to utilize two identical loops, such as the loops 16 and 18, with the grooves thereof disposed at right angles to one another as herein disclosed. With such an arrangement the loop 18 will have its greatest lateral yieldability in the directions in which the loop 16 has its least yieldability, and vice versa. Even greater uniformity of lateral response may be achieved, if desired, by the use of three or more loops superimposed on the same vertical axis and disposed in appropriate symmetrical angular relationship. Unequal response along the several axes in the horizontal plane may be achieved, if desired, by utilizing non-identical loops or by disposing the two or more loops in asymmetrical orientation. Non-identical loops may differ for example in wall thickness, groove depth or overall dimensions or combinations of such factors.

The elastomeric element of the present invention affords a further advantage in that it responds to negative loads in a non-linear manner such as to offer rapidly increasing resistances to deflections of increasing amplitude which tend to separate the bodies 10 and 12 as viewed in FIG. 1. Thus, a force which moves the body 12 upwards away from the body 10 will be effective to place the side walls of the loops 16 and 18 under tension and then to bend the bottom wall of loop 16 upwards and the top wall of loop 18 downwards. Since the latter walls are relatively thick and stiff they will offer very great resistance to bending and thus will effectively prevent upward displacements of undesirable amplitude under heavy negative shock loads. As a result of this feature of the invention it is not necessary, in many instances, to provide supplemental limiting means for extreme negative deflections. Similarly, as will be apparent from the above description, the response of the elastomeric elements herein disclosed is such in downward and lateral directions that supplemental limiting devices need not be provided in many instances for extreme shock loads in such directions.

The self-limiting action of the elastomeric elements of the present invention combined with the unusually wide range of displacements available in a unit of given size makes it possible to effectively protect valuable equipment in a simple and economical manner.

I claim:

1. In a shock and vibration isolator, the combination of a yieldable element comprising at least two loops stacked vertically and fixed against rotation relative to one another about a vertical axis with the axes of said loops lying respectively in vertically spaced horizontal planes and disposed angularly with respect to one another, each of said loops being made of elastomeric material and comprising at least four walls hinged to one another in series along lines of intersection which extend parallel with the axis of said loop, two of said walls being in opposed generally horizontal relation to constitute upper and lower walls, the upper and lower walls respectively of the uppermost and lowermost of said loops being adapted to be connected to two objects between which it is desired to isolate vibration and shock loads; each of said loops having a plurality of grooves opening into the inner surface of said loop, one of said grooves being provided for each of said lines of intersection and each groove extending lengthwise along a line parallel with and adjacent the line of intersection for which it is provided, each of said grooves having the bottom thereof extending toward but terminating short of the outer surface of said loop adjacent the line of intersection between the respectively adjacent walls thereby providing in the vicinity of each line of intersection a wall portion having a thickness of elastomeric material which is substantially less than that of the thinnest portions of the respectively adjacent walls, said grooves being so shaped and disposed that incident to deflections of said objects toward or laterally with respect to one another which are greater than a predetermined amplitude at least one of said grooves in at least one of said loops will close thereby increasing the effective wall thickness in the vicinity of the line of intersection adjacent said closed groove at least to a thickness approximately that of the walls which intersect along said adjacent line of intersection.

2. A shock and vibration isolator in accordance with claim 1 wherein those upper and lower walls disposed interiorly of said stack are provided with an opening of predetermined diameter, and wherein a compressively resilient load-carrying means of cylindrical conformation having a diameter such as to pass through said opening is extended vertically through said opening with the opposite ends thereof resting respectively against the inner surfaces of the outermost upper and lower wall in said stack.

3. In a shock and vibration isolator, the combination of a yieldable element comprising at least two generally rectangular hollow bodies having open sides, said bodies being stacked vertically and fixed against rotation relative to one another about a vertical axis with the axes of said bodies which extend through said open sides lying respectively in vertically spaced horizontal planes and disposed angularly with respect to one another, each of said bodies being made of elastomeric material and comprising opposed generally horizontally disposed upper and lower walls, and opposed generally vertically disposed end walls each connected along generally horizontally disposed lines of intersection with said upper and lower walls to form the four corners of said body, the upper and lower walls respectively of the uppermost and lowermost of said bodies being adapted to be connected to two objects between which it is desired to isolate vibration and shock loads; each of said bodies having a plurality of grooves opening into the hollow portion of said body and each having the opposite ends thereof opening into said open sides, one of said grooves being provided for each of said lines of intersection and each groove extending lengthwise along a line parallel with and adjacent the line of intersection for which is is provided, each of said grooves having the bottom thereof extending toward but terminating short of the outer surface of said body adjacent the line of intersection between the respectively adjacent walls thereby providing in the vicinity of each corner of said body a wall portion having a thickness of elastomeric material which is substantially less than that of the thinnest portions of said vertically disposed end walls, said grooves being so shaped and disposed that incident to deflections of said objects toward or laterally with respect to one another which are greater than a predetermined amplitude at least one of said grooves in at least one of said bodies will close thereby increasing the effective wall thickness adjacent said closed groove at least to a thickness approximately that of the walls which intersect along said adjacent line of intersection.

4. A shock and vibration isolator in accordance with claim 3 wherein those upper and lower walls disposed inwardly of said stack are provided with an opening of predetermined diameter, and wherein a compressively resilient load-carrying means of cylindrical conformation having a diameter such as to pass through said opening is extended vertically through said opening with the opposite ends thereof resting respectively against the inner surfaces of the outermost upper and lower wall in said stack.

References Cited by the Examiner

UNITED STATES PATENTS

| | | | |
|---|---|---|---|
| 2,216,814 | 10/1940 | Gray et al. | 248—21 |
| 2,612,370 | 9/1952 | Eger | 267—63 |
| 2,965,349 | 12/1960 | Hutton | 248—358 |
| 3,037,764 | 6/1962 | Paulsen | 267—63 |
| 3,128,985 | 4/1964 | Wallerstein | 248—358 |

CLAUDE A. LE ROY, *Primary Examiner.*

JOHN PETO, *Examiner.*